E. C. SPEDDEN.
ROTARY MEASURING DEVICE.
APPLICATION FILED APR. 30, 1913.
1,092,672.
Patented Apr. 7, 1914.
2 SHEETS—SHEET 1.
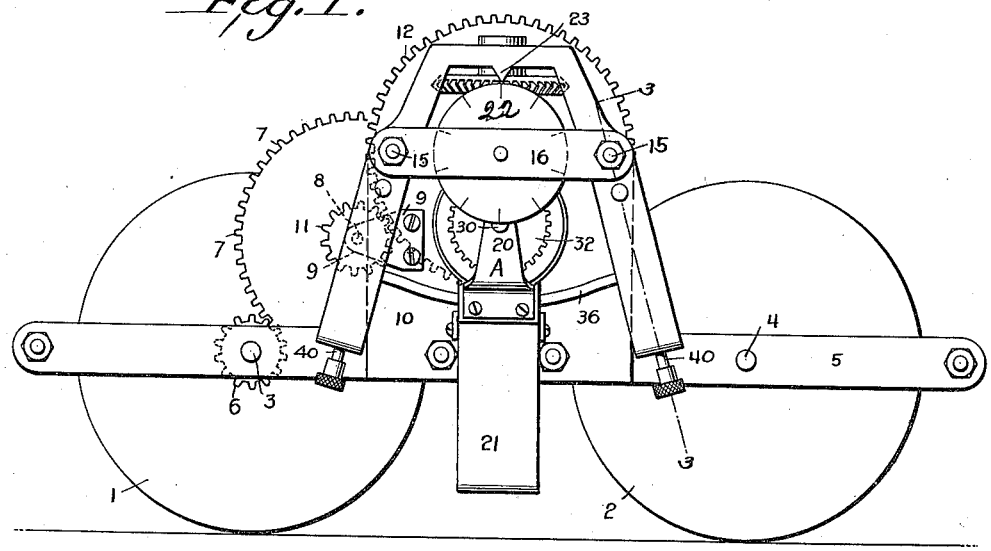
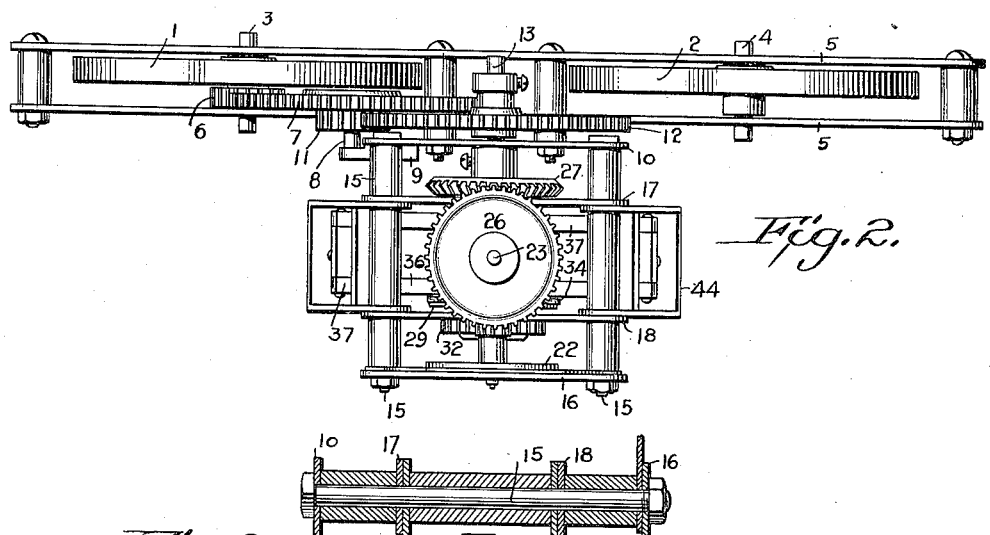
WITNESSES
INVENTOR
Edward C. Spedden
BY 
ATTORNEYS E. C. SPEDDEN.
ROTARY MEASURING DEVICE.
APPLICATION FILED APR. 30, 1913.
1,092,672.
Patented Apr. 7, 1914.
2 SHEETS—SHEET 2.
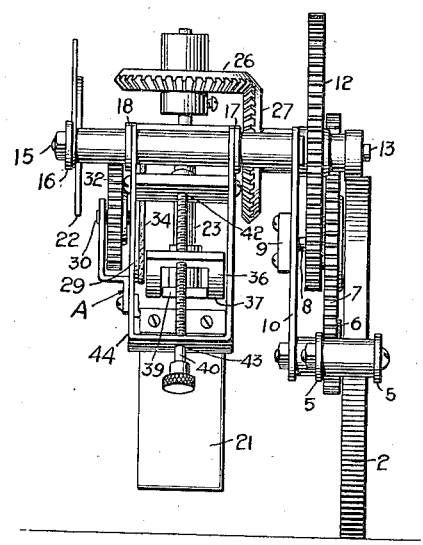
Fig. 4.
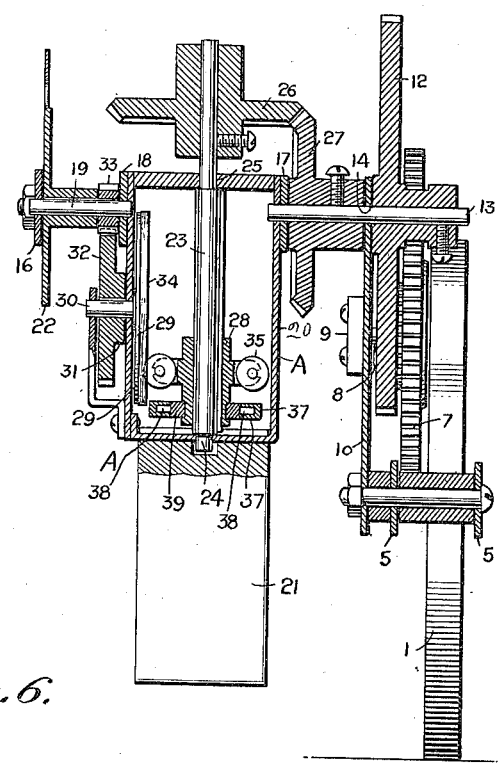
Fig. 5.
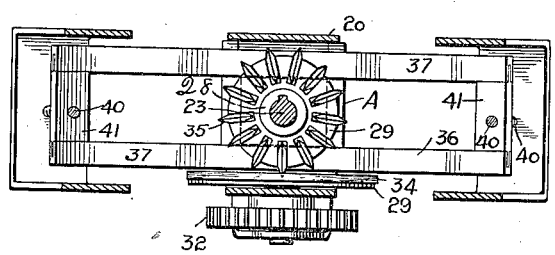
Fig. 6.
Fig. 7.
WITNESSES
Oliver W. Holmes
INVENTOR
Edward C. Spedden
BY Munn & Co
ATTORNEYS
COLUMBIA PLANOGRAPH CO., WASHINGTON, D. C.

UNITED STATES PATENT OFFICE.

EDWARD CLIFFORD SPEDDEN, OF GRANGEVILLE, IDAHO.

ROTARY MEASURING DEVICE.

1,092,672. Specification of Letters Patent. Patented Apr. 7, 1914.

Application filed April 30, 1913. Serial No. 764,569.

*To all whom it may concern:*

Be it known that I, EDWARD C. SPEDDEN, a citizen of the United States, and a resident of Grangeville, in the county of Idaho and State of Idaho, have invented a new and Improved Rotary Measuring Device, of which the following is a full, clear, and exact description.

This invention relates to a measuring instrument especially adapted for use in connection with vehicles for measuring the distance a vehicle travels on an imaginary horizontal line, irrespective of the contour of the road on which the vehicle travels. While the instrument is useful in this particular application it is to be understood that it may be employed to make linear measurements generally.

The invention has for one of its objects to improve the construction of linear measuring instruments of the rotary type, so as to be reliable and efficient in use, composed of comparatively few parts that are not liable to get out of order, and wherein the design is such that the device is comparatively inexpensive.

Another object of the invention is the provision of a measuring device in which there is employed between the measuring wheel and the dial or indicating mechanism a novel pendulum controlled speed changing device whereby the instrument can travel over irregular surfaces or up and down slopes without the actual surface distance being indicated on the dial, but rather the distance the instrument travels in a horizontal direction.

With these objects in view, and others as will appear as the description proceeds, the invention comprises various novel features of construction and arrangement of parts which will be more fully described hereinafter and set forth with particularity in the claims appended hereto.

In the accompanying drawings, which illustrate one embodiment of the invention, and wherein similar reference characters are employed to designate corresponding parts throughout the several views, Figure 1 is a side view of the instrument; Fig. 2 is a plan view thereof; Fig. 3 is an enlarged sectional view on the line 3—3 of Fig. 1; Fig. 4 is an end view of the instrument; Fig. 5 is an enlarged central transverse section; Fig. 6 is a horizontal section through the automatic speed-changing device; and Fig. 7 is a diagrammatic view to indicate the relative position of the parts of the speed-changing device with different grades over which the instrument is moved.

Referring to the drawings, 1 and 2 indicate the road surface engaging wheels of the instrument, which wheels are mounted on axles 3 and 4, respectively, that are journaled in a pair of spaced and connected horizontal bars 5. The wheel 1 is the distance measuring wheel and serves to drive the movable element of the indicating mechanism. On the axle 3 is a pinion 6 which meshes with a large gear wheel 7 which is rotatably mounted on a stud 8 carried by a bracket 9 fastened to the supporting plate or frame 10, which plate 10 is secured to one of the bars 5. The wheel 7 is provided with a pinion 11 that meshes with a large gear wheel 12, which, as shown in Fig. 5, is secured to a shaft 13 journaled in the bearing opening 14 of the plate 10. These gears and pinions constitute a speed reducing transmission wherein the ratio of speed reduction may be varied as desired by properly proportioning the parts.

Extending laterally from the plate 10 are horizontal posts 15 which carry at their outer ends a cross bar 16, and between the plate 10 and cross bar 16 are intermediate cross bars 17 and 18 spaced apart to carry a pendulum device A. Mounted centrally in the cross-bars 16 and 18 is a horizontal shaft or arbor 19 which is disposed in alinement with the shaft 13, so that the opposed ends of the said shafts form pivots or trunnions on which the pendulum device A is mounted to swing in a plane parallel with the plane of rotation of the measuring wheel 1.

The pendulum device A consists of a U-shaped frame 20 which carries at its bottom a weight 21 or equivalent means, and within this pendulum device is a speed changing means operatively connecting the shafts 13 and 19 together, the latter shaft being provided with a dial 22 coöperating with an index 23 for indicating the horizontal distance that the instrument is moved when a measurement is to be taken.

Mounted in the body 20 of the pendulum device is a rotary shaft 23 journaled in bearings 24 and 25, and on the upper end of this shaft is a bevel gear 26 meshing at all times with a bevel gear 27 on the shaft 13. Slidable on the shaft 23 is an element 28 of the speed changing means, and cooperating with the element 28 is a wheel 29 which has a flat face disposed parallel with the shaft 23. This wheel 29 is provided with a journal 30 mounted in bearings 31 in the body 20 of the pendulum device, and on the journal 30 is a gear wheel 32 that meshes with a pinion 33 on the dial shaft 19. The wheel 29 has a rubber or other face 34 with which the element 28 engages, said element having teeth 35 in the form of radially-disposed wheels that are adapted to engage the rubber face of the wheel 29 to impart rotation to such wheel as the shaft 23 rotates. As the pendulum device A shifts back and forth with respect to the body of the instrument the element 28 is adapted to shift along the shaft 23 so that the point of engagement of the element 28 with the wheel 29 will shift to and from the center of the latter, so that the indicating dial 22 will have a speed that changes with respect to the speed of the measuring wheel 1, according to the contour of the surface over which the instrument moves, the speed of the indicating dial being such that it will indicate the horizontal distance traveled by the instrument. The shifting of the element 28 is effected by a track or guide 36 composed of two oppositely-disposed grooved rails 37 in which slidably engages the nibs 38 of a block 39 disposed between the rails, said block having journaled therein the hub of the element 28. The center of the track 36 is in the same plane with the axes of the shafts 19 and 23 and with the axis of the wheel 29, and the track is curved symmetrically in a direction upwardly on increasing radii on a line more or less like the line $a, b$, Fig. 7. As the pendulum moves to either side of a central position the sliding block 39 will travel along the line $a, b$, and throw the element 28 outwardly to engage the wheel 29 near its periphery, thereby reducing the speed of the indicating dial 22. As the pendulum device returns to neutral position the speed of the indicating dial increases. The track 36 is adjustably supported at its ends by screws 40 that are threaded in the end bars 41 of the track and journaled in bearings 42, 43 of U-shaped frames 44 mounted on the posts 15. By turning the screws 40 in one direction the track can be raised, and by turning them in the opposite direction the track can be lowered so that the instrument can be adjusted to obtain the proper speed ratio between the measuring wheel 1 and the dial 22.

In Fig. 7 the diagram showing the relative position of the pendulum device and sliding block is shown for an instrument having a range of movement between 60° grades in both directions, which range is larger than the range possible with the instrument shown in Fig. 1. If the track 36 is made as long as the line $a, b$, Fig. 7, the instrument will be capable of enabling horizontal distances to be measured where the surface over which the instrument is moved contains grades of 60° or less. When the instrument is moving over a grade of 60° the sliding block will be at the points $a$ or $b$, according to whether the instrument is ascending or descending the grade, and consequently the element 28 will engage the wheel 29 adjacent its periphery, whereby the speed of rotation of the wheel 29 will be reduced to its minimum point. When the instrument is traveling in a horizontal plane with the pendulum device in zero or vertical position, the element 28 will be at the nearest point to the center of the wheel 29 that it ever attains. In this position the speed of rotation of the wheel 29 and of the indicating dial will be a maximum. The dial 22 will have on its face suitable divisions and subdivisions for indicating the distance traveled in feet or other suitable dimensions, and if desired a suitable intergrading registering device may be employed instead of the dial 22, or in combination therewith, so that the total number of feet or other units traveled horizontally by the instrument may be shown at any time.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. An apparatus of the class described comprising a measuring wheel, an indicating device including a rotary element, a transmission means between the wheel and element, and a pendulum device controlling the transmission means for rotating the said element at such relative speed to the measuring wheel as to indicate the distance the apparatus is moved horizontally, said transmission means comprising a driven element operatively connected with the rotary element of the indicating device, and a driving element movable with the pendulum for varying the speed ratio of the driving and driven elements automatically.

2. An apparatus of the class described comprising a measuring wheel, an indicating element movable simultaneously with the wheel, and a speed changing means between the wheel and element, the said speed changing means comprising a pendulum, a track, a driving element movable along the track with the pendulum, and a driven element with which the driving element engages and to which the indicating element is operatively connected.

3. An apparatus of the class described comprising a measuring wheel, a frame supporting the same, a pendulum, a shaft carried by the pendulum and operatively connected with said wheel, a driving element slidably mounted on the shaft, a driven wheel carried by the pendulum with its axis eccentric to the pivotal center of the pendulum, means for shifting the driving element on the shaft by the swinging of the pendulum to change the point of engagement of the driving element with the driven wheel, and an indicating means connected with the driven wheel.

4. An apparatus of the class described comprising a measuring wheel, a frame supporting the same, a pendulum, a shaft carried by the pendulum and operatively connected with said wheel, a driving element slidably mounted on the shaft, a driven wheel carried by the pendulum with its axis eccentric to the pivotal center of the pendulum, means for shifting the driving element on the shaft by the swinging of the pendulum to change the point of engagement of the driving element with the driven wheel, and means for adjusting the last mentioned means toward or from the pivotal center of the pendulum.

5. An apparatus of the class described comprising surface engaging wheels, a frame on which the wheels are mounted, a pair of oppositely-disposed shafts, gearing between one shaft and one of the said wheels, an indicator connected with the other shaft, a pendulum mounted to swing on the said shafts as an axis, a shaft carried by the pendulum, a gear between the pendulum-carried shaft and the shaft connected with one of the said wheels, a driving element slidable on the pendulum-carried shaft, a track fixed with respect to the pendulum, a block movable along the track and operatively connected with the said driving element for shifting the same, and a driven wheel operatively connected with the indicator and with which the driving element engages.

6. An apparatus of the class described comprising surface-engaging wheels, a frame on which the wheels are mounted, a pair of oppositely-disposed shafts, gearing between one shaft and one of the said wheels, an indicator connected with the other shaft, a pendulum mounted to swing on the said shafts as an axle, a shaft carried by the pendulum, a gear between the pendulum-carried shaft and the shaft connected with one of the said wheels, a driving element slidable on the pendulum-carried shaft, a track fixed with respect to the pendulum, a block movable along the track and operatively connected with the said driving element for shifting the same, a driven wheel operatively connected with the indicator and with which the driving element engages, and an adjusting screw operatively connected with the track for moving the same toward and from the axis on which the pendulum swings.

7. An apparatus of the class described comprising surface-engaging wheels, a frame on which the wheels are mounted, a pair of oppositely-disposed shafts, gearing between one shaft and one of the said wheels, an indicator connected with the other shaft, a pendulum mounted to swing on the said shafts as an axis, a shaft carried by the pendulum, a gear between the pendulum-carried shaft and the shaft connected with one of the said wheels, a driving element slidable on the pendulum-carried shaft, a track fixed with respect to the pendulum, a block movable along the track and operatively connected with the said driving element for shifting the same, and a driven wheel operatively connected with the indicator and with which the driving element engages, said driven wheel having rotary teeth in its periphery for engagement with the said driving wheel.

In testimony whereof I have signed my name to this specification in the presence of two subscribing witnesses.

EDWARD CLIFFORD SPEDDEN.

Witnesses:
M. M. MOON,
C. G. SCHMODEKA.

---

Copies of this patent may be obtained for five cents each, by addressing the "Commissioner of Patents, Washington, D. C."